United States Patent [19]

Bouvot et al.

[11] Patent Number: 4,612,847
[45] Date of Patent: Sep. 23, 1986

[54] VACUUM CONTROL DEVICE FOR THE DISPLACEMENT OF AN ELEMENT BETWEEN AT LEAST THREE POSITIONS

[75] Inventors: Jean-François Bouvot, Dampierre; José LeBorgne, Trappes, both of France

[73] Assignee: Valeo, Paris, France

[21] Appl. No.: 616,476

[22] Filed: Jun. 1, 1984

[30] Foreign Application Priority Data

Jun. 3, 1983 [FR] France ............................... 83 09301

[51] Int. Cl.$^4$ ............................................. F01B 31/14
[52] U.S. Cl. ..................................... 92/13.1; 92/13.2; 92/13.6; 92/64; 92/94
[58] Field of Search ...................... 92/48, 63, 64, 13.1, 92/13.2, 13.6, 94

[56] References Cited

U.S. PATENT DOCUMENTS

| 3,187,640 | 6/1965 | Young | 92/48 |
| 3,302,534 | 2/1967 | Bauer | 92/64 |
| 4,284,261 | 8/1981 | Benjamin | 92/13.1 |
| 4,309,156 | 1/1982 | Gonner | 92/13.1 |
| 4,522,111 | 6/1985 | Kobelt | 92/64 |

FOREIGN PATENT DOCUMENTS 2160964  7/1973  France .
1135524 12/1968  United Kingdom .

*Primary Examiner*—Abraham Hershkovitz
*Attorney, Agent, or Firm*—Dennison, Meserole, Pollack & Scheiner

[57] ABSTRACT

A vacuum control device comprises a casing in which are disposed at least two substantially parallel movable cups, the first cup being connected to the element to be displaced. Springs are interposed respectively between the two cups and between the second cup and a bottom end-wall of the casing. Two pipes or nipples connected to a vacuum source and to atmospheric pressure open into the casing respectively within the space located between the two cups and within the space located between the second cup and the casing end-wall.

8 Claims, 6 Drawing Figures

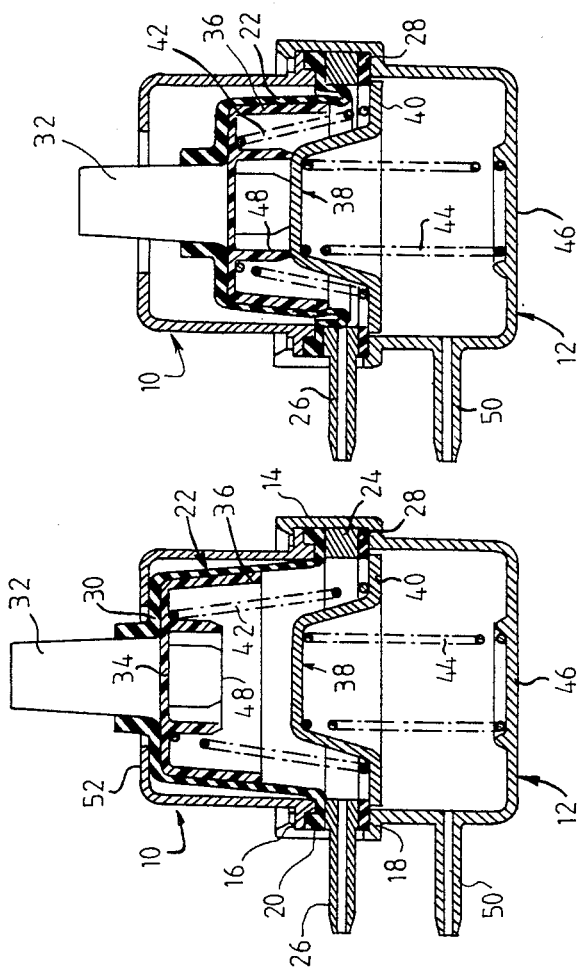

VACUUM CONTROL DEVICE FOR THE DISPLACEMENT OF AN ELEMENT BETWEEN AT LEAST THREE POSITIONS

This invention relates to a vacuum control device for the displacement of any element between at least three positions. The invention is primarily applicable to the field of automotive vehicles in which the device serves to actuate a flap of an installation for heating or air-conditioning of the occupant compartment of a vehicle body.

In comparison with cable control devices, vacuum control devices offer an advantage in that the positional arrangement of the control unit on the dashboard of a vehicle is independent of the position of the element to be displaced, whereas this is not the case in a cable control system. A further advantage is that a lower effort is required in order to operate a control unit of this type.

Furthermore, in the event of failure of the control unit, the element to be displaced is automatically returned by means of restoring springs to a predetermined safety position which, in the case of a flap, can be a position which controls deicing or demisting of the windshield of the vehicle.

At the present time, certain types of vacuum control devices must be capable of displacing an element such as a flap, for example, between at least three positions comprising two end positions and an intermediate position in order to ensure a sufficient degree of comfort within the occupant compartment of the vehicle. Known devices of this type usually comprise a casing in which are mounted two substantially parallel movable cups carried by diaphragms, the first cup being connected to the element to be displaced by any suitable means. Springs are interposed respectively between the two cups and between the second cup and a bottom end-wall of the casing. Two pipes each intended to be connected to a vacuum source and to free air open into the casing, respectively within the space located between the two cups and within the space located between the second cup and the bottom end-wall of the casing.

In the known technique, the two cups are positively connected to each other by means of a coupling member which has a predetermined maximum length and can be of the telescopic or articulated type. A first end position of the first cup connected to the element to be displaced is obtained when the two pipes which open into the casing are connected to free air and when the ambient pressure prevails within the casing. In this position, the restoring springs of both cups are unstressed. A changeover from this first end position to an intermediate position is carried out by producing a partial vacuum between the second cup and the bottom end-wall of the casing. This results in displacement of the second cup towards the bottom end-wall of the casing and in compression of its restoring spring. The first cup follows the displacement of the second cup by reason of the coupling member which provides a connection between them and the restoring spring of said first cup remains unstressed. A changeover from this intermediate position to the third position (the end position opposite to the first) is carried out by producing a partial vacuum within the space located between the two cups. This results in displacement of the first cup toward the second cup which remains in a stationary position of abutment on the bottom end-wall of the casing, and in compression of the restoring spring associated with the first cup.

Conversely, connection of the space between the two cups to free air results in return of the first cup to the intermediate position by reason of the release of its restoring spring whereas connection to free air of the space between the second cup and the bottom end-wall of the casing results in return of the two cups to the first position by reason of the release of the restoring spring associated with the second cup.

The arrangement in which a coupling member between the two cups has a predetermined maximum length and a minimum length as short as possible not only complicates the assembly and installation of the device but also increases its overall size and cost.

The primary object of the invention is to overcome these disadvantages in a vacuum control device of the general type indicated in the foregoing.

The invention is also directed to a device of this type which can be converted very simply and very economically to a device for controlling the displacement of an element between more than three positions.

To this end, the invention accordingly proposes a vacuum control device for the displacement of an element between at least three positions, comprising a casing in which are disposed at least two substantially parallel movable cups, the first cup being connected to the element to be displaced. Springs are interposed respectively between the two cups and between the second cup and a bottom end-wall of the casing. Two pipes or nipples adapted to be connected to a vacuum source and to free air open into the casing respectively within the space located between the two cups and within the space located between the second cup and the bottom end-wall of the casing. The distinctive feature of the device lies in the fact that only the first cup is carried by a deformable flexible diaphragm attached at its periphery to the casing and having the function of dividing the internal space of said casing in leak-tight manner whilst the second cup is mounted within the casing with a clearance and in a non-leaktight manner so as to be capable of moving between the end-wall and a fixed portion of casing against which said cup can be applied in leak-tight manner by the associated spring, thereby dividing the internal space of the casing into two chambers which are separated in leak-tight manner.

Thus in the control device in accordance with the invention, the two cups no longer need to be connected by means of a coupling member having a predetermined maximum length and the intermediate position of the element is defined by the displacement of the first cup and the compression of the associated restoring spring whilst the second cup remains stationary.

Furthermore, the second cup does not need to be carried by a flexible and deformable diaphragm attached at its periphery to the casing. This makes it possible to achieve a further simplification in both assembly and installation of the control device as well as to reduce its cost.

In another embodiment of the invention, the second cup is carried by a flexible and deformable diaphragm attached at its periphery to the casing. This diaphragm extends over that face of the second cup which is directed towards the first cup and has a central portion clamped against the second cup by means of a base against which the spring interposed between the two cups is applied.

This arrangement accordingly prevents any danger of detachment of the diaphragm from the second cup when a reduced pressure (partial vacuum) is created within the internal space of the casing between the two cups in order that the element to be displaced may be changed-over from its first position to its intermediate position, thus achieving enhanced reliability of the control device.

In accordance with another distinctive feature of the invention, the spring which is interposed between the second cup and the end-wall of the casing develops a force which is higher than that of the spring interposed between the two cups.

The intermediate position of the first cup and therefore of the element to be displaced is thus defined in a wholly reliable manner.

In accordance with a further distinctive feature of the invention, the second cup is abuttingly applied against a fixed portion of the casing in the aforementioned first and second positions of the element to be displaced.

This feature makes it easier to define in a reliable manner the intermediate or second position of the element to be displaced in which the first cup is applied against the second cup.

Other features of the invention will be more apparent upon consideration of the following description and accompanying drawings, wherein:

FIGS. 1, 2 and 3 are longitudinal sectional views of a first embodiment of a device in accordance with the invention, this device being shown in three different positions;

Figure 6:
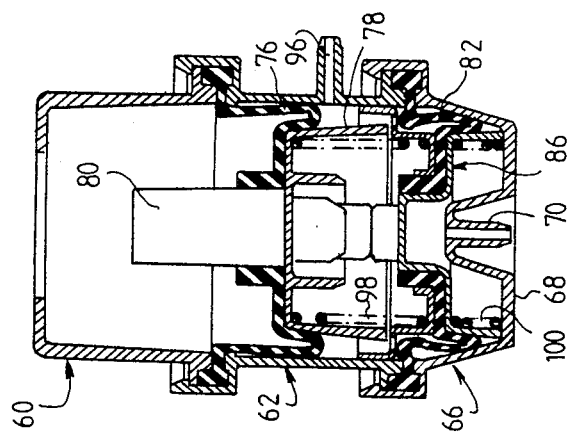
FIGS. 4, 5 and 6 are views which correspond to FIGS. 1, 2 and 3 respectively, but illustrate a second embodiment of the invention.

Reference will first be made to FIGS. 1 to 3 which illustrate the first embodiment of the device in accordance with the invention. This device comprises a casing consisting of two sections 10 and 12 assembled together by clip attachment or by means of a resilient snap-fastening system in which elastically deformable arms 14 of the lower casing section 12 cooperate by snap-fastening onto an annular flange 16 of the upper casing section 10. Between said flange 16 of the upper section 10 and a corresponding annular flange 18 of the lower casing section 12 formed by an internal shouldered portion of said casing section are clamped the periphery 20 of a flexible and deformable diaphragm 22, an annular member 24 provided with a connecting-nipple 26 which opens into the interior of the annular member 24 and an annular seal 28. The annular seal 28 is placed between the flange 18 of the lower casing section 12 and the underface of the annular member 24. The periphery 20 of the diaphragm 22 is placed between the top face of the annular member 24 and the flange 16 of the upper casing section 10.

A rod 32 passes in leak-tight manner through the central portion 30 of the diaphragm 22. Said rod extends axially upwards from the base 34 of a first cup 36 having a substantially cylindrical or slightly frusto-conical skirt which is oriented in the downward direction. Said first cup is applied against the underface of the diaphragm 22 and is carried by this latter.

A second cup 38 is placed within the lower casing section 12 beneath the first cup 36 and has an outwardly directed bottom annular flange 40, the external diameter of which is smaller than the internal diameter of the lower casing section 12 and larger than the internal diameter of the flat annular seal 28 in order to be applied against this latter in leak-tight manner. A restoring spring 42 is provided between the first cup 36 and the second cup 38 in order to exert a thrust on the two cups which are thus continuously urged away from each other. Another restoring spring 44 is placed between the second cup 38 and the bottom end-wall 46 of the lower casing section 12 in order to subject said second cup to a thrust which continuously urges this latter away from the end-wall 46.

The base 34 of the first cup 36 has a tubular portion 48 which is oriented towards the second cup 38.

The lower casing section 12 is provided in the same manner as the annular member 24 with a nipple 50 which forms a connecting-pipe and opens into the interior of the lower casing section 12. The two nipples 26 and 50 both form connecting-pipes which are intended to be connected to a vacuum source or to free air under the control of suitable means provided on the dashboard of the vehicle when the device in accordance with the invention is intended to control the displacement of a flap or like element of an installation for heating or air-conditioning of the occupant compartment of the vehicle. Said flap or like element is positively connected to the rod 32 of the first cup 36.

The device in accordance with the invention operates as follows:

The position shown in FIG. 1 corresponds to a first position or end-of-travel position of the element to be displaced, this position being reached when the two nipples 26 and 50 are connected to free air. Under these conditions, the ambient pressure prevails within the casing and, more specifically, within the internal space of said casing as defined on the one hand between the first cup 36 and its diaphragm 22 and on the other hand the second cup 38 as well as within the internal space defined between the second cup 38 and the bottom end-wall 46 of the lower casing section 12.

In this position, the second cup 38 is thrust in the upward direction by its restoring spring 44 and its annular flange 40 is applied in leak-tight contact with the flat annular seal 28. The first cup 36 is also thrust upward by its restoring spring 42 and comes into abutment with a top annular flange 52 of the upper casing section 10 through the intermediary of the central portion 30 of the diaphragm 22. Said top annular flange 52 defines an orifice through which passes the rod 32 for providing a connection with the element to be displaced.

This first position is therefore well-defined by reason of the abutting contact of the two cups 36 and 38 with fixed elements of the casing of the device.

A changeover from this first position to the intermediate position shown in FIG. 2 is produced by connecting the nipple 26 to the vacuum source whilst the nipple 50 is still open to the atmosphere. Under these conditions, the reduced pressure (partial vacuum) maintained within the internal space located between the first cup 36 and the second cup 38 results in a displacement of the first cup 36 toward the second cup 38 and in compression of the restoring spring 42 associated with the first cup 36 until the lower tubular portion 48 of the first cup 36 comes into abutment with the second cup 38. The second cup 38 remains in the same position as in FIG. 1, on the one hand by reason of the partial vacuum which produces action on its top face and on the other hand by reason of the force developed by its restoring spring 44 which is higher than the force developed by the restoring spring 42 of the first cup 36.

The second position or intermediate position shown in FIG. 2 is therefore a stable position which is perfectly defined by reason of the fact that the first cup 36 is applied against the second cup 38 and by reason of the fact that the second cup 38 is applied against the annular seal 28.

A changeover from the intermediate position of FIG. 2 to the third position or end-of-travel position shown in FIG. 3 is produced by connecting the nipple 50 to the vacuum source whilst the nipple 26 still remains connected to said vacuum source. The partial vacuum which then prevails within the internal space located between the second cup 38 and the bottom end-wall 46 of the lower casing section 12 balances the partial vacuum which prevails within the internal space located between the first cup 36 and the second cup 38. The cup 38 is no longer maintained in contact with the annular seal 28 and no longer performs its abutment function for the cup 36. As mentioned earlier, the external diameter of the annular flange 40 of the second cup 38 is smaller than the internal diameter of the lower casing section 12, with the result that the second cup 38 is displaceable in non-leaktight manner within the lower casing section 12. Since the top face of the cup 36 is still exposed to ambient pressure and the bottom face of the cup is exposed to reduced pressure (partial vacuum), said cup 36 continues to move and accordingly exerts a downward thrust on the second cup 38 while compressing the restoring spring 44 until the annular flange of said second cup comes into abutment with the bottom end-wall 46 of the lower casing section 12.

The third position of the device is also perfectly defined by reason of the abutting application of the second cup 38 against the bottom end-wall of the lower casing section 12 and by reason of the abutting application of the first cup 36 against the second cup 38.

A changeover from the third position shown in FIG. 3 to the intermediate position shown in FIG. 2 is obtained by connecting the nipple 50 to the atmosphere whilst the nipple 26 remains connected to the vacuum source.

Advantageously, the internal cross-sectional area of the connecting-nipple 26 is smaller than that of the nipple 50 in order to facilitate the establishment of ambient pressure within the lower casing section 12 with respect to the application of a partial vacuum by means of the connecting-nipple 26. Under these conditions, the two cups 36 and 38 are returned to the intermediate position of FIG. 2 by expansion of the restoring spring 44 until the annular flange 40 of the second cup 38 is restored to leak-tight application against the annular seal 28 whilst the first cup 36 remains in abutting contact with the second cup 38 or is restored to abutting contact with this latter as soon as the annular flange 40 is applied against the annular seal 28.

It is then possible to change-over from the intermediate position of FIG. 2 to the first position of FIG. 1 by connecting the nipple 26 to the atmosphere.

A reduction of internal cross-sectional area of the connecting-nipple 26 with respect to the internal cross-sectional area of the connecting-nipple 50 can be obtained by selecting a nipple 26 having an internal diameter which is smaller than that of the nipple 50, or by means of a constriction or throttled portion at any point of this nipple or of the pipe which connects this latter to the vacuum source.

The device in accordance with the invention as shown in FIGS. 1 to 3 offers a number of advantages over the prior art technique, especially the fact that there is no connecting member between the two cups 36 and 38 and the fact that the second cup 38 is not carried by a flexible and deformable diaphragm of the same type as the diaphragm 22 which carries the first cup 36. Generally speaking, this device is also of smaller overall size than known devices of the prior art.

Figure 5:
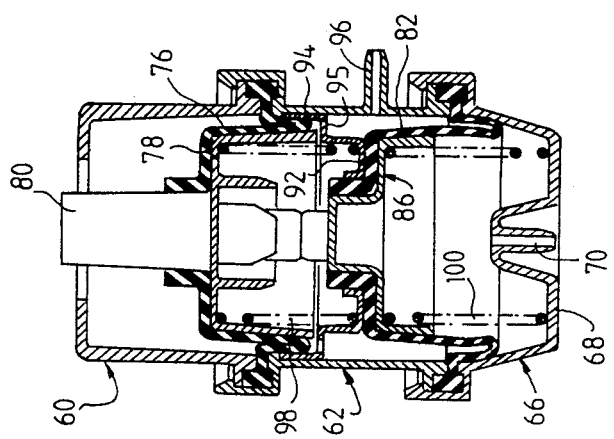
Figure 4:
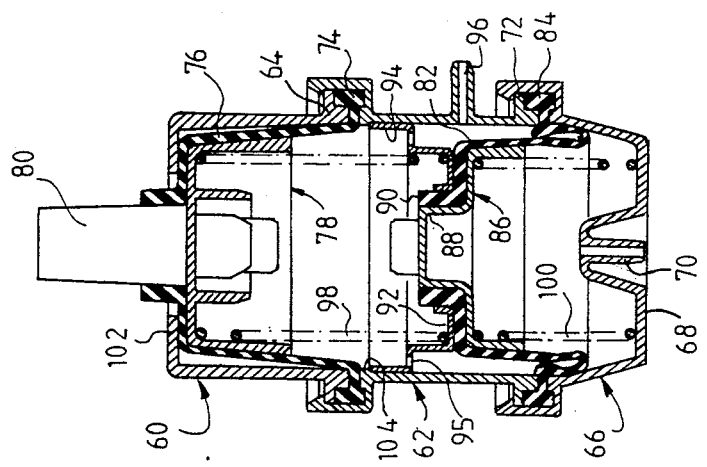

Reference will now be made to FIGS. 4 to 6 which illustrate a second embodiment of the invention.

In these figures, the casing of the device in accordance with the invention consists of a top casing section 60 which is similar to the upper casing section 10 of FIGS. 1 to 3 and of an intermediate casing section 63 of tubular shape which is open at both ends and is mounted by clip attachment or by snap-fastening onto a bottom annular flange 64 of the top casing section 60. Said casing also consists of a bottom casing section 66 having a bottom end-wall 68 provided with a nipple 70 and mounted by clip attachment or snap-fastening onto a lower annular flange 72 of the intermediate casing section 62.

The periphery 74 of a flexible and deformable diaphragm 76 which is similar to the diaphragm 22 of the first embodiment is clamped between the casing sections 60 and 62. Said diaphragm 76 is adapted to carry a first cup 78 which is similar to the first cup 36 of the first embodiment and is provided with a rod 80 or any suitable means for connecting the device to the element to be displaced.

A second flexible and deformable diaphragm 82 is clamped at its periphery 84 between the casing sections 62 and 66 and is adapted to carry a second cup 86 having a closed tubular upper portion 88 which is forcibly fitted within a central collar 90 of the diaphragm 82. The central portion of said diaphragm is clamped between the second cup 86 (which is applied against the underface of said diaphragm) and a tubular base 92 applied against the top face of said diaphragm and provided with a cylindrical skirt 94 which is oriented upwards in the direction of the first cup 78. Said cylindrical skirt 94 has an external diameter which is very slightly smaller than the internal diameter of the intermediate casing section 62 in order to be capable of sliding within said intermediate casing section and in order to form a guide for the displacement of the second cup 86. The tubular base 92 is mounted in non-leaktight manner within the interior of the intermediate casing section 62 and is accordingly provided with apertures 95.

A restoring spring 98 is provided between the first cup 78 and the tubular base 92 and another restoring spring 100 is provided between the second cup 86 and the bottom end-wall 68 of the bottom casing section 66.

The intermediate casing section 62 is provided with a nipple 96 for connecting it either to a vacuum source or to the atmosphere.

The operation of this device is similar to that of the device shown in FIGS. 1 to 3 and takes place as follows:

A first position is illustrated in FIG. 4 in which the two nipples 70 and 96 are connected to the atmosphere. Under these conditions, the ambient pressure prevails within the internal space of the casing of the device located between the two diaphragms 76 and 82 and within the internal space located between the diaphragm 82 and the bottom end-wall 68 of the bottom casing section 66. The first cup 78 is thrust by its restoring spring 98 against a top annular rim 102 of the top casing section 60 whilst the second cup 86 is thrust by its restoring spring 100 against a fixed portion of the intermediate casing section 62, said fixed portion being formed by an internal shoulder 104 of said casing section against which is applied the upper end of the skirt 94 of the base 92.

A changeover from this first position to the intermediate position shown in FIG. 5 is achieved by allowing the connecting-nipple 70 of the bottom casing section 66 to remain open to the atmosphere and by connecting the nipple 96 of the intermediate casing section 62 to a vacuum source. The establishment of a partial vacuum within the internal space located between the diaphragms 76 and 82 results in displacement of the first cup 78 toward the second cup 86 and in compression of the restoring spring 98, whereupon the first cup 78 comes into abutting contact with the second cup 86. Said second cup 86 remains stationary under the combined action of the reduced pressure on its top face and of its restoring spring 100 which develops a force of greater magnitude than that of the restoring spring 98 of the first cup 78. In this intermediate position, the base 92 has the design function of determining the position of the second cup 86 with a high degree of accuracy by means of the abutting application of its cylindrical skirt 94 against the internal annular shoulder 104 of the intermediate casing section 62 and also of preventing detachment of the diaphragm 82 from the second cup 86.

A changeover from this intermediate position to the third position shown in FIG. 6 is effected by connecting the nipple 70 of the bottom casing section 66 to the vacuum source to which the nipple 96 of the intermediate casing section 62 remains connected. By reason of the partial vacuum which then exists within the internal space of the casing located between the diaphragm 82 and the bottom end-wall 68 of the bottom casing section, the second cup 86 is in equilibrium and moves downwards until it comes into abutting contact with the end-wall 68 of the bottom casing section while compressing its restoring spring 100 under the thrust exerted by the first cup 78.

The device is switched back from the third position to the intermediate position of FIG. 5 by connecting the nipple 70 to atmospheric pressure whilst the nipple 96 remains connected to the vacuum source. Similarly, the device is switched back from the intermediate position to the first position shown in FIG. 4 by connecting the nipple 96 to the atmosphere in the same manner as the nipple 70.

In general terms, the device in accordance with the invention therefore makes it possible to control the displacement of any element between three positions and can be very readily converted for controlling the displacement of the element between at least four positions. To this end, it is only necessary in regard to the embodiment of FIGS. 1 to 3 to replace the bottom end-wall 46 of the lower casing section 12 by another cup of the same type as the second cup 38. This additional cup will also be applied against an annular seal and will also be controlled by a restoring spring supported on the end-wall of the casing or else on yet antner cup.

In regard to the embodiment of FIGS. 4 to 6, it is merely necessary to replace the bottom end-wall 68 of the bottom casing section 66 by an additional cup of the type just considered by way of addition to the device of FIGS. 1 to 3. Alternatively, said additional cup could be carried by a diaphragm in the same manner as the second cup 86 of the second embodiment.

What is claimed is:

1. A vacuum control device for the displacement of an element between at least three positions, comprising a casing in which are disposed at least two spaced substantially parallel movable cups, said casing having a bottom end-wall, the first cup being connected to the element to be displaced, said second cup being spaced from said bottom end-wall, springs interposed respectively between the two cups and between the second cup and said bottom end-wall of the casing, and two fluid communication means adapted to be connected to a vacuum source and to atmospheric air and opening into the casing respectively within the space located between the two cups and within the space located between the second cup and the bottom end-wall of the casing, a deformable flexible diaphragm carrying said first cup and having a periphery attached to the casing and providing a leak-tight division of the internal space of said casing said second cup being mounted within the casing with a clearance and in a non-leaktight manner for movement toward and away from said end-wall, said casing including a fixed portion remote from said bottom end-wall, the associated spring resiliently biasing said second cup into sealing engagement against said fixed portion, thereby dividing the internal space of the casing into two space chambers which are separated in leak-tight manner the two space chambers communicating with each other upon movement of the second cup away from said fixed portion.

2. A device according to claim 1, wherein the two cups are without any positive connection between them.

3. A device according to claim 1, wherein the three positions of the element to be displaced include a first and a third end-position of the element defined respectively by application of ambient pressure within the casing via the two fluid communication means and by application of a partial vacuum within the casing via said two fluid communication means and a second position or intermediate position defined by application of a partial vacuum solely between the two cups whilst the internal space of the casing between the second cup and the bottom end-wall of the casing is at ambient pressure.

4. A device according to claim 3 wherein the fluid communication means which opens into the casing within the space between the two cups has an internal cross-sectional area which is smaller than that of the other fluid communication means.

5. A device according to claim 3, wherein the second cup is in abutting contact with the aforesaid fixed portion of the casing in the aforesaid first and second positions of the element to be displaced.

6. A device according to claim 1, wherein the spring interposed between the second cup and the bottom end-wall of the casing develops a force of greater magnitude than that of the spring which is interposed between the two cups.

7. A device according to claim 1, wherein the aforesaid fixed portion of the casing against which the second cup is capable of being applied is an annular seal.

8. A device according to claim 1 wherein the fluid communication means which opens into the casing within the space between the two cups has an internal cross-sectional area which is smaller than that of the other fluid communication means.

* * * * *